United States Patent [19]

Ohmura et al.

[11] Patent Number: 5,128,421
[45] Date of Patent: Jul. 7, 1992

[54] METHOD FOR PREPARING HYDROXYALKYL-FUNCTIONALIZED POLYPHENYLENE ETHER WITH EPOXY COMPOUND REACTANT

[75] Inventors: Haruo Ohmura; Mitsutoshi Aritomi, both of Yokkaichi, Japan

[73] Assignee: Mitsubishi Petrochemical Co., Ltd., Tokyo, Japan

[21] Appl. No.: 660,954

[22] Filed: Feb. 26, 1991

[30] Foreign Application Priority Data

Feb. 28, 1990 [JP] Japan .................................. 2-45653
Feb. 28, 1990 [JP] Japan .................................. 2-45655
Apr. 10, 1990 [JP] Japan .................................. 2-92998

[51] Int. Cl.⁵ .............................................. C08G 65/48
[52] U.S. Cl. ............................................ 525/396; 525/390; 525/394
[58] Field of Search ......................... 525/396, 394, 390

[56] References Cited

U.S. PATENT DOCUMENTS 4,743,661  5/1988  Mitulla et al. ...................... 525/396
5,041,504  8/1991  Brown et al. ....................... 525/396

FOREIGN PATENT DOCUMENTS 0347539  12/1989  European Pat. Off.

Primary Examiner—Harold D. Anderson
Attorney, Agent, or Firm—Oblon, Spivak, McClelland, Maier & Neustadt

[57] ABSTRACT

Disclosed is a method for preparing a hydroxyalkyl-functionalized polyphenylene ether which comprises reacting a polyphenylene ether represented by the formula:

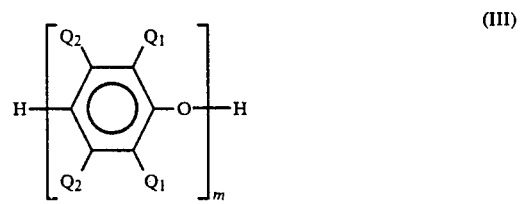

(III)

wherein $Q_1$ each represents a halogen atom, a primary or secondary alkyl group, a phenyl group, an aminoalkyl group, a hydrocarbonoxy group or a halohydrocarbonoxy group; $Q_2$ each represents a hydrogen atom, a halogen atom, a primary or secondary alkyl group, a phenyl group, a haloalkyl group, a hydrocarbonoxy group or a halohydrocarbonoxy group; and $m$ is an integer of 10 or more, with a functionalizing agent in the presence or absence of an organic solvent capable of dissolving the polyphenylene ether and in the presence of a basic catalyst.

8 Claims, 3 Drawing Sheets

METHOD FOR PREPARING HYDROXYALKYL-FUNCTIONALIZED POLYPHENYLENE ETHER WITH EPOXY COMPOUND REACTANT

BACKGROUND OF THE INVENTION

This invention relates to a method for preparing hydroxyalkyl-functionalized polyphenylene ether which is obtained by functionalizing of the terminal phenolic hydroxyl group of a polyphenylene ether.

More specifically, the hydroxyalkyl-functionalized polyphenylene ether according to the method of the present invention can be considered to have effects, when blended with the other resin, etc., of heightening solubility between resins by reacting with functional groups of a resin to be blended and increasing strength of a composition as compared with a non-functionalized polyphenylene ether resin. Further, it is available for a precursor of a graft or block copolymer.

A polyphenylene ether resin is an extremely available thermoplastic resin having excellent heat resistance, mechanical characteristics, electric characteristics, water resistance, acid resistance, alkali resistance and self-extinguishing properties. Thus, it has been planning to use for many applications as an engineering plastic material. However, this resin has high melt viscosity which relates to high glass transition temperature, and thus, poor in molding property. Further, it has a disadvantage that impact resistance is poor as an engineering plastic.

In order to solve these problems, a polyolefin or an engineering plastic is blended with the polyphenylene ether, but the polyphenylene ether is essentially poor in compatibility with these polymers. Also, the resulting composition is weak and lowered in mechanical strength and impact strength whereby such a composition cannot be practically used. For solving the problem, a compatibilizing agent has been used, but many of the compatibilizing agents are a graft or block copolymer of the both polymers. When these copolymers are to be synthesized, a terminal phenolic hydroxyl group of the polyphenylene ether resin can be considered to react with a functional group in the other polymer.

However, the kinds of functional groups of the other polymers capable of reacting with the terminal phenolic hydroxyl group are limited so that utilizable range is restricted naturally. Thus, many functionalized polyphenylene ethers have been proposed in order to heighten reactivity of the polyphenylene ether resin. In Japanese Provisional Patent PCT Publications No. 500456/1987, No. 500803/1988 and No. 503391/1988, examples of some hydroxyalkyl group-functionalized polyphenylene ethers have been mentioned, but many steps of reactions are required for preparing the same and a melting reaction at a high temperature should be employed in many cases. Also, even when the modification can be carried out under relatively moderate reaction conditions, there is the problem that expensive acid chloride should necessarily be used. Further, in Japanese Provisional Patent Publication No. 128021/1988, there is disclosed a method in which a polyphenylene ether and ethylene oxide or propylene oxide are reacted to hydroxyalkylate the terminal of the polyphenylene ether. However, this method involves the problems that the reaction should be carried out under high pressure, control of an added number of ethylene oxide or propylene oxide is difficult and a uniform product can hardly be obtained.

SUMMARY OF THE INVENTION

An object of the present invention is to provide a method for preparing a hydroxyalkyl-functionalized polyphenylene ether under advantageous reaction conditions which are improved method of the conventional ones.

The present inventors have found that by functionalizing the terminal phenolic hydroxyl group of a polyphenylene ether with a functionalizing agent in the presence or absence of an organic solvent and in the presence of a basic catalyst, a modified polyphenylene ether can be obtained extremely easily to accomplish the present invention.

That is, the present invention comprising reacting a polyphenylene ether represented by the formula:

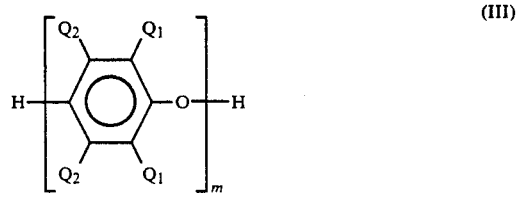

(III)

wherein $Q_1$ each represents a halogen atom, a primary or secondary alkyl group, a phenyl group, an aminoalkyl group, a hydrocarbonoxy group or a halohydrocarbonoxy group; $Q_2$ each represents a hydrogen atom, a halogen atom, a primary or secondary alkyl group, a phenyl group, a haloalkyl group, a hydrocarbonoxy group or a halohydrocarbonoxy group; and m is an integer of 10 or more, with a functionalizing agent in the presence or absence of an organic solvent capable of dissolving the polyphenylene ether and in the presence of a basic catalyst, and (1) the functionalizing agent comprises a glycidol represented by the following formula:

(II$_A$)

and a hydroxyalkyl-functionalized polyphenylene ether is represented by the following formula:

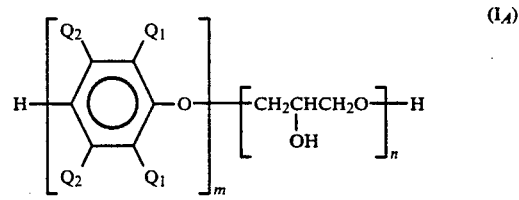

(I$_A$)

wherein $Q_1$, $Q_2$ and m have the same meanings as defined above, and n is an integer of 1 to 10;

(2) the functionalizing agent comprises an epihalohydrin represented by the following formula:

(II$_B$)

wherein X represents a halogen atom, and a hydroxyalkyl-functionalized polyphenylene ether obtained by hydrolyzing a terminal glycidylated polyphenylene ether is represented by the following formula:

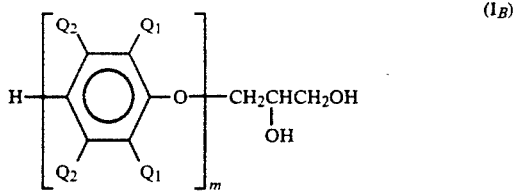

(I$_B$)

wherein Q$_1$, Q$_2$ and m have the same meanings as defined above;

(3) the functionalizing agent is an alkylene carbonate represented by the formula:

(II$_C$)

wherein R represents a hydrogen atom or an alkyl group having 1 to 8 carbon atoms,
and a hydroxyalkyl-functionalized polyphenylene ether is represented by the formula:

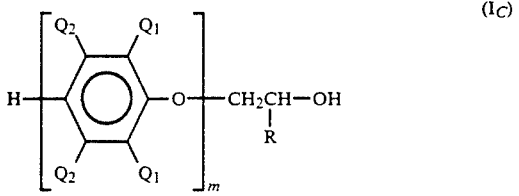

(I$_C$)

wherein Q$_1$, Q$_2$, m and R have the same meanings as defined above;

and (4) the functionalizing agent is a halogenated alkyl alcohol represented by the formula:

$$X-R^1-OH \quad (II_D)$$

wherein X represents a halogen atom, and R$^1$ represents an alkylene group having 1 to 10 carbon atoms,
and a hydroxyalkyl-functionalized polyphenylene ether is represented by the following formula:

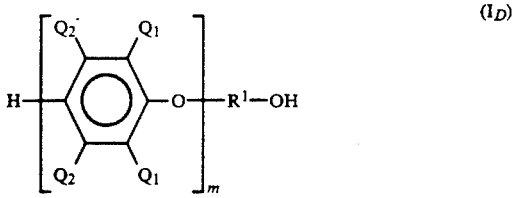

(I$_D$)

wherein Q$_1$, Q$_2$, m and R$^1$ have the same meanings as defined above.

DESCRIPTION OF THE PREFERRED EMBODIMENTS

Figure 1:
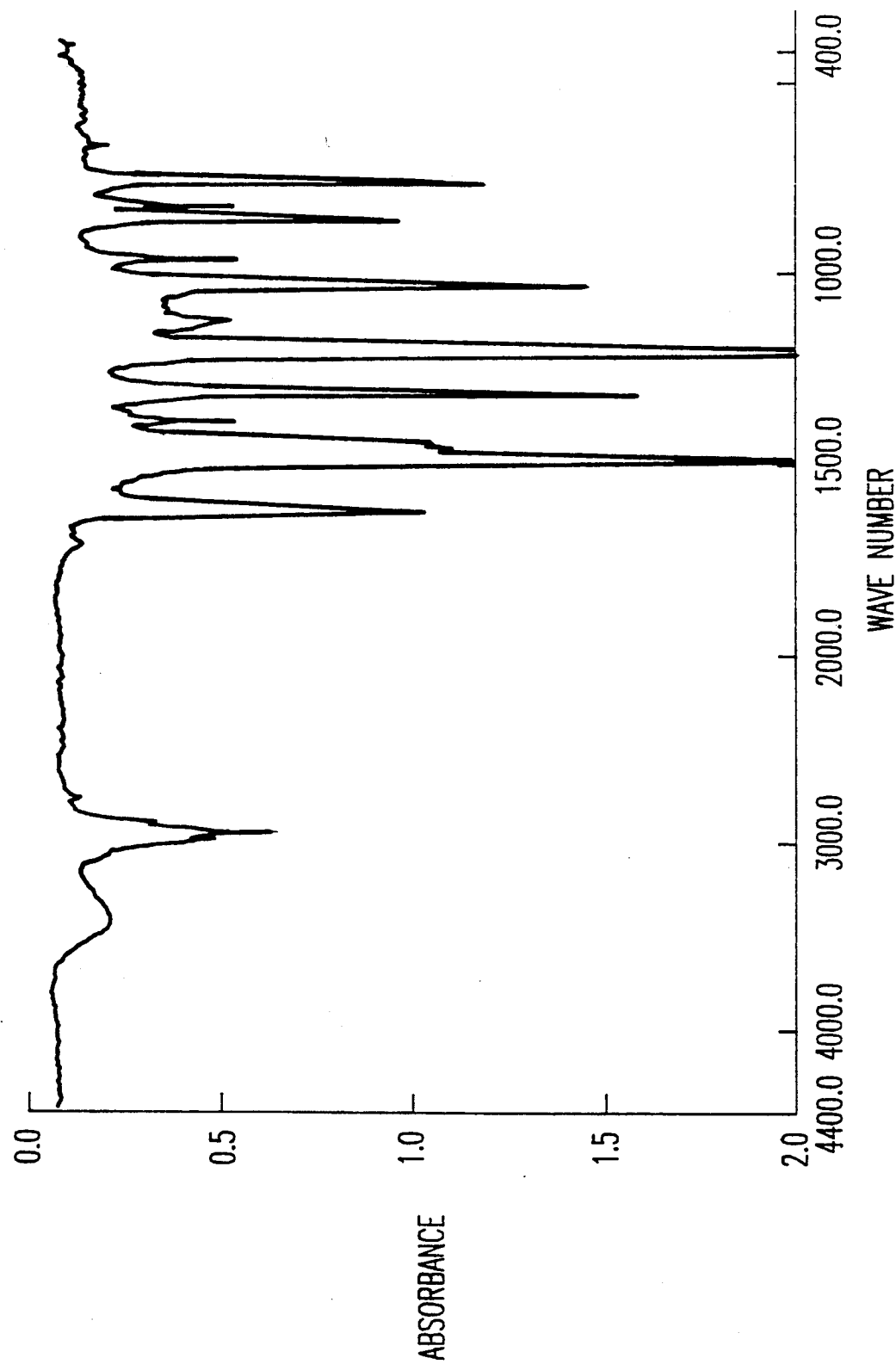
FIG. 1 is an infrared absorption spectrum of hydroxyalkyl-functionalized polyphenylene ether (cast film prepared from a chloroform solution) obtained in Example 1.

The polyphenylene ether to be used in the present invention is a homopolymer or a copolymer having a structural unit represented by the following formula:

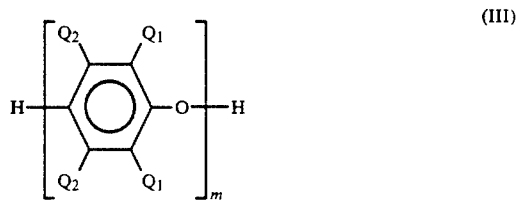

(III)

Preferred examples of the primary alkyl group of Q$_1$ and Q$_2$ may include methyl, ethyl, n-propyl, n-butyl, n-amyl, isoamyl, 2-methylbutyl, n-hexyl, 2,3-dimethylbutyl, 2-, 3- or 4-methylpentyl and heptyl groups. Examples of the secondary alkyl group may include isopropyl, sec-butyl and 1-ethylpropyl groups. In many cases, Q$_1$ is preferably an alkyl group or a phenyl group, particularly preferably an alkyl group having 1 to 4 carbon atoms and Q$_2$ is a hydrogen atom.

Preferred homopolymer of the polyphenylene ether may include, for example, those comprising a 2,6-dimethyl-1,4-phenylene ether unit. Preferred copolymer may include a random copolymer comprising the combination of the above and a 2,3,6-trimethyl-1,4-phenylene ether unit. Many suitable homopolymers or random copolymers are described in patents and literatures. For example, it is preferred to use a polyphenylene ether containing a molecular constitutional component which improves characteristics of a molecular weight, a melt viscosity and/or impact strength. They may include, for example, polyphenylene ethers in which a vinyl monomer such as acrylonitrile or vinyl aromatic compound including styrene, or a polymer such as a polystyrene or an elastomer thereof are grafted on the polyphenylene ether.

A molecular weight of the polyphenylene ether is generally preferably those in which an intrinsic viscosity in chloroform at 30° C. is 0.2 to 0.8 dl/g or so.

The polyphenylene ether can be usually prepared by oxidation coupling reaction of the above monomers. As for the oxidation coupling polymerization reaction of the polyphenylene ether, many catalyst systems have been known. Selection of the catalyst is not specifically limited and either of the conventionally known catalysts can be used. Such catalysts may include at least one of a compound of a heavy metal such as copper, manganese and cobalt generally in combination with the other various substances. The functionalizing agent (II$_A$) to be used in the present invention is glycidol, and specific examples of the functionalizing agent (II$_B$) of epihalohydrin may include epichlorohydrin, epibromohydrin and epiiodohydrin.

Also, preferred examples of the functionalizing agent of the alkylene carbonate represented by the formula (II$_C$) may include ethylene carbonate and propylene carbonate.

Further, preferred examples of the functionalizing agent of the halogenated alkyl alcohol represented by the formula (II$_D$) may include 2-chloroethanol, 3-chloro-l-propanol, 1-chloro-2-propanol, 4-chloro-1-butanol, 5-chloro-1-pentanol, 6-chloro-l-hexanol, 2-bromoethanol, 3-bromo-l-propanol, 1-bromo-2-propanol, 1-bromo-2-butanol and 2-iodoethanol.

Of these functionalizing agents represented by the formulae (II$_A$) to (II$_D$), (II$_A$) and (II$_B$) are preferred since they can add 2 or more alcoholic hydroxyl groups having different reactivity to one mole of the terminal phenolic hydroxyl group of the polyphenylene ether, particularly glycidol of the formula (II$_A$) is preferred.

For effecting the method of the present invention, the polyphenylene ether (III) is reacted with any one of glycidol (II$_A$), the epihalohydrin (II$_B$), the alkylene carbonate (II$_C$) or the halogenated alkyl alcohol (II$_D$) as the functionalizing agent in the presence or absence of an organic solvent and in the presence of a basic catalyst.

The organic solvents to be used in the present invention may include an aromatic hydrocarbon such as benzene, toluene and xylene; a halogenated hydrocarbon such as chloroform and carbon tetrachloride; a halogenated aromatic hydrocarbon such as chlorobenzene and dichlorobenzene; and a heterocyclic compound such as N-methyl-2-pyrrolidone, and the like.

As the basic catalyst mentioned above, there may be mentioned an alcoholate such as sodium methoxide, sodium ethoxide and potassium t-butoxide; an alkali metal hydroxide such as sodium hydroxide and potassium hydroxide; and an alkali metal carbonate such as sodium carbonate and potassium carbonate, and the like.

A reaction ratio of the polyphenylene ether and the functionalizing agent to be used in the method of the present invention is 1 to 50 moles, preferably 1 to 20 moles of the functionalizing agent based on one mole of the terminal phenolic hydroxyl group of the polyphenylene ether. However, in the case that the functionalizing agent can also act as a reaction solvent, the amount is not limited by those as mentioned above and it may be used with a larger excess amount.

The basic catalyst is preferably used in an amount of 1 to 30 parts by weight based on 100 parts by weight of the polyphenylene ether.

The reaction is practiced in a temperature range of 50° to 200° C. under an inert atmosphere such as nitrogen or argon. Preferred temperature range is a temperature range not exceeding a boiling point of the reaction solvent to be used.

When epihalohydrin is used as the functionalizing agent, a glycidylated polyphenylene ether is obtained in a first step reaction and then the material is hydrolyzed as a second step reaction. The second step reaction is carried out by adding 5 to 100 parts of water to 1 part by weight of the glycidylated polyphenylene ether formed in the first step reaction and adding 0.01 to 0.1 part by weight of a water soluble acid such as sulfuric acid, perchloric acid and acetic acid as a catalyst to react them at a temperature range of 20° to 100° C.

EXAMPLES

In the following, the present invention will be described in more detail by referring to examples.

Incidentally, the reaction ratio of the terminal phenolic hydroxyl group of the polyphenylene ether was calculated by determining an amount of the terminal phenolic hydroxyl group before and after the reaction in accordance with the method described in Journal of Applied Polymer Science; Applied Polymer Symposium, vol. 34 (1978), pp. 103 to 117.

The Case Where Glycidol is Used as the Functionalizing Agent

An average added number (n in the general formula (IA)) in the case of using glycidol as the functionalizing agent is estimated by the following equation.

$$n = \frac{W_1 - W_0}{74} \times \frac{\overline{Mn}}{W_0} \times \frac{100}{R} \quad (IV)$$

wherein $W_1$ and R each represent a weight of a terminal modified polyphenylene ether isolated after completion of the reaction and a terminal reaction ratio of the same, respectively; and $W_0$ and $\overline{Mn}$ each represent a weight of a polyphenylene ether used in the reaction and a number average molecular weight of the same, respectively.

EXAMPLE 1

200 ml of toluene was added to 20 g of poly(2,6-dimethyl-1,4-phenylene ether) (intrinsic viscosity measured at 30° C. in chloroform was 0.31 dl/g), and the mixture was completely dissolved by stirring in a nitrogen atmosphere at 100° C. To the solution were added 5 g of sodium ethoxide and 10 ml of methanol, and then 3 g of glycidol was added dropwise over 20 minutes. Stirring was further continued at 100° C. for 7 hours. The reaction mixture was poured into 600 ml of methanol to precipitate a hydroxyalkyl-functionalized polyphenylene ether as a product. The formed product was collected by filtration and washed twice with methanol and dried at 80° C. under reduced pressure. The yield was 21.5 g.

This hydroxyalkyl-functionalized polyphenylene ether showed an absorption derived from a hydroxyl group at 3,380 cm$^{-1}$ of an infrared absorption spectrum as shown in FIG. 1. When the determination of the terminal phenolic hydroxyl group was practiced, it had been found that 90% was reacted.

The above results show that, when the calculation formula of the above formula (IV) is used, to the terminal group of the polyphenylene ether used for the reaction, 6.7 in average of glycidols are bound.

EXAMPLE 2

In the same manner as in Example 1, the reaction was practiced except for using 0.6 g of sodium ethoxide as the catalyst and 2 ml of methanol and replacing the used amount of glycidol with 0.7 g. The formed modified polyphenylene ether was 20.3 g and the reaction ratio of the terminal group was 85 %.

The above results show that, when the calculation formula of the above formula (IV) is used, to the terminal group of the polyphenylene ether used for the reaction, 1.4 in average of glycidols are bound.

APPLICATION EXAMPLE 1

200 ml of xylene was added to 5 g of the terminal modified polyphenylene ether obtained in Example 1 and 5 g of a polypropylene modified with maleic anhydride (maleic anhydride content: 1.3% by weight, number average molecular weight $\overline{Mn}=43,200$, weight average molecular weight $\overline{Mw}=125,000$), and the mixture was reacted under a nitrogen atmosphere at 110° C. for 4 hours. The reaction mixture was poured into 800 ml of methanol to precipitate a polymer, and the polymer was collected by filtration. Further, the polymer was washed twice with each 800 ml of methanol and dried at 80° C. under reduced pressure to obtain 9.6 g of a polymer.

Subsequently, 3.3 g of the resulting polymer was extracted by a Soxhlet apparatus using 300 ml of chloroform as a solvent. As the result, unreacted polyphenylene ether extracted as a chloroform soluble component was 1.3 g. From this fact, the content of the polyphenylene ether in the resulting polyphenylene ether-polypropylene copolymer was found to be 17.5 % by weight.

The Case Where Epihalohydrin is Used as the Functionalizing Agent

EXAMPLE 3

To 350 g of poly(2,6-dimethyl-1,4-phenylene ether) (intrinsic viscosity measured at 30° C. in chloroform was 0.40 dl/g) was added 5 liters of epichlorohydrin, and the mixture was dissolved by stirring in a nitrogen atmosphere at 100° C. To the solution were added 70 g of sodium ethoxide and 300 ml of methanol over 20 minutes, and stirring was further continued at 100° C. for 4 hours. After the reaction mixture was cooled to room temperature, 10 liters of methanol was added to precipitate a modified polyphenylene ether as a product. After the product was collected by filtration, it was successively washed with 10 liters of methanol, then with each 10 liters of pure water twice and with 10 liters of methanol again. The resulting modified polyphenylene ether was dried at 80° C. under reduced pressure to obtain 351 g of a glycidylated polyphenylene ether.

When the terminal group was determined, it was found that 99% of the terminal phenolic hydroxyl group was reacted.

To 10 g of the resulting glycidylated polyphenylene ether were added 100 ml of pure water and 0.5 g of conc. sulfuric acid and the mixture was refluxed under heating for 5 hours. The reaction mixture was poured into one liter of methanol to precipitate the formed hydroxyalkyl-functionalized polyphenylene ether. Next, the product was dissolved again in 200 ml of chloroform and poured into one liter of methanol to effect reprecipitation and purification. The product was dried at 80° C. under reduced pressure to obtain 10 g of hydroxyalkyl group-functionalized polyphenylene ether (n=1 in the formula ($I_A$), i.e. which corresponds to the formula ($I_B$)).

The Case Where Alkylene Carbonate is Used as the Functionalizing Agent

EXAMPLE 4

In 400 ml of chlorobenzene was dissolved 40 g of poly(2,6-dimethyl-1,4-phenylene ether) (intrinsic viscosity measured at 30° C. in chloroform was 0.40 dl/g). Subsequently, 4.4 g of ethylene carbonate and 0.4 g of potassium carbonate were added to the solution and the mixture was further continued to stir at 120° C. for 8 hours.

After the reaction mixture was cooled, it was gradually poured into 1.5 liters of methanol to precipitate the formed functionalized polyphenylene ether. The precipitated polymer was collected by filtration, washed with 1.5 liters of pure water and then washed twice with each 1.5 liters of methanol. The polymer was dried at 80° C. under reduced pressure to obtain 38.5 g of a hydroxyethylated polyphenylene ether.

Figure 2:
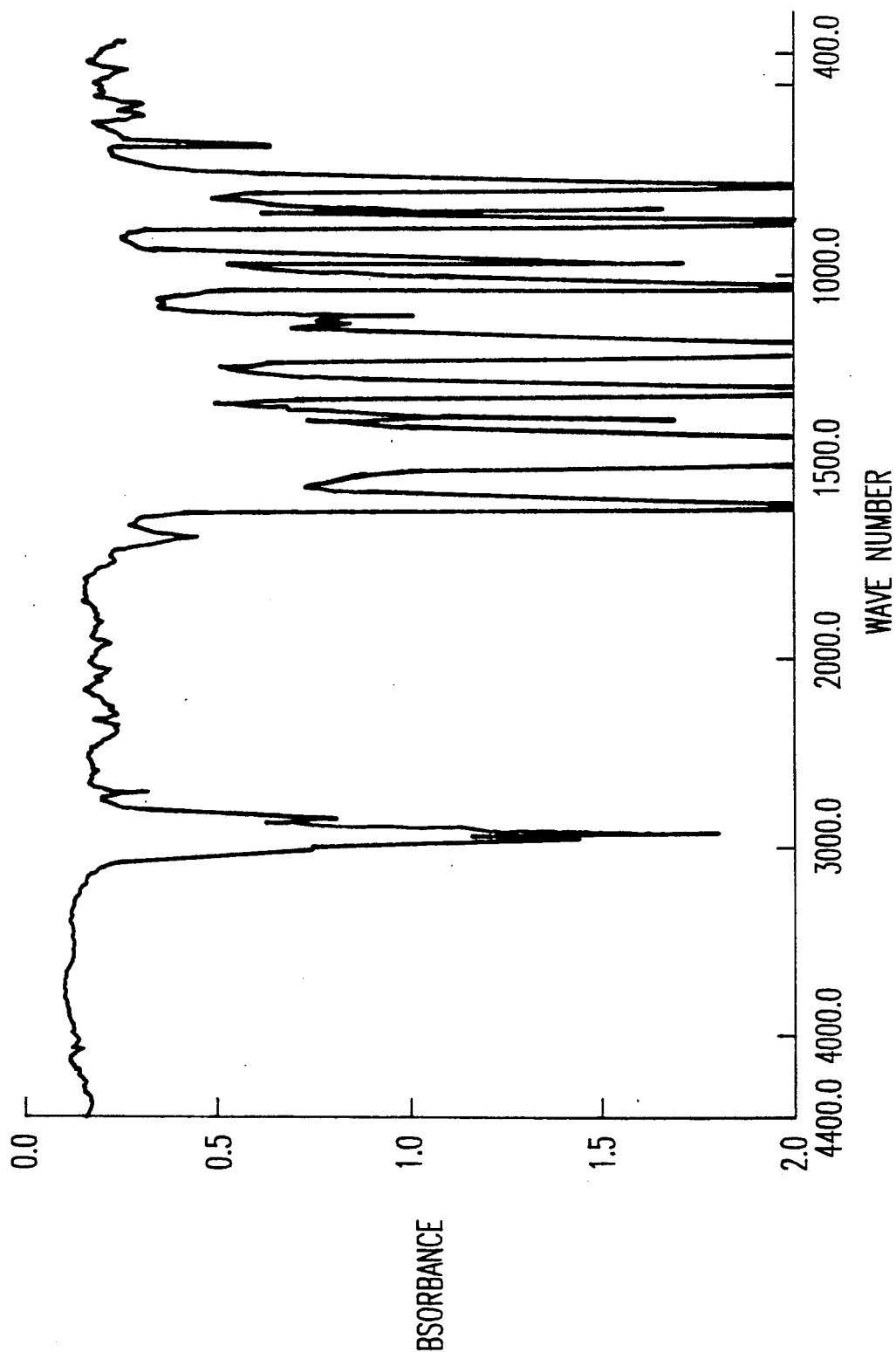
FIG. 2 is an infrared absorption spectrum of hydroxyalkyl-functionalized polyphenylene ether (cast film prepared from a chloroform solution) obtained in Example 4.

An infrared absorption spectrum of the hydroxyethylated polyphenylene ether is shown in FIG. 2, it shows an absorption considered to be derived from a hydroxyl group at around 3600 cm$^{-1}$. Also, from the determination of the terminal phenolic hydroxyl group before and after the reaction, it can be found that 50% of the terminal group was reacted.

EXAMPLE 5

In 200 ml of xylene was dissolved 20 g of poly(2,6-dimethyl-1,4-phenylene ether) (intrinsic viscosity measured at 30° C. in chloroform was 0.30 dl/g). Subsequently, 20.0 g of propylene carbonate and 0.3 g of potassium carbonate were added to the solution and the mixture was further continued to stir at 132° C. for 7 hours. The reaction mixture was gradually poured into one liter of methanol and the formed functionalized polyphenylene ether was precipitated. The precipitated polymer was collected by filtration, washed with one liter of pure water and then washed twice with each one liter of methanol. The polymer was dried at 80° C. under reduced pressure to obtain 19.0 g of a 2-hydroxypropylated polyphenylene ether.

This 2-hydroxypropylated polyphenylene ether showed an absorption considered to be derived from a hydroxyl group at the neighbor of 3600 cm$^{-1}$ of an infrared absorption spectrum. Also, from the determination of the terminal phenolic hydroxyl group before and after the reaction, it can be found that 49 % of the terminal group was reacted.

APPLICATION EXAMPLE 2

200 ml of xylene was added to 17.1 g of the hydroxyethylated polyphenylene ether obtained in Example 4 and 5 g of a polypropylene modified with maleic anhydride (maleic anhydride content: 1.3 % by weight, number average molecular weight $\overline{Mn}=43,200$, weight average molecular weight $\overline{Mw}=125,000$), and the mixture was reacted under a nitrogen atmosphere at 130° C. for 7 hours. The reaction mixture was poured into 1.2 liters of methanol to precipitate a polymer, and the polymer was collected by filtration. Further, the polymer was washed twice with each 1.2 liters of methanol and dried at 85° C. under reduced pressure and heating to obtain 21.4 g of a polymer.

Subsequently, 2.54 g of the resulting polymer was extracted by a Soxhlet apparatus using 300 ml of chloroform as a solvent. As the result, unreacted polyphenylene ether extracted as a chloroform soluble component was 1.83 g. From this fact, the content of the polyphenylene ether in the resulting polyphenylene ether-polypropylene copolymer was found to be 19.7 % by weight.

The Case Where Halogenated Alkyl Alcohol is Used as the Functionalizing Agent

EXAMPLES 6 TO 10

In a reactor were charged poly(2,6-dimethyl-1,4-phenylene ether) (intrinsic viscosity measured at 30° C. in chloroform was 0.31 dl/g), a functionalizing agent shown in Table 1, sodium ethoxide and a reaction solvent with amounts as shown in Table 1, and the mixture was reacted by stirring under heating and nitrogen atmosphere. After completion of the reaction, the reaction mixture was poured into a large amount of methanol to precipitate the formed modified polymer. Subsequently, the modified polymer obtained by filtration was washed with water and with methanol twice. The polymer was dried at 85° C. under heating and reduced pressure to obtain hydroxyalkyl-functionalized polyphenylene ether. The results are shown in Table 1.

Figure 3:
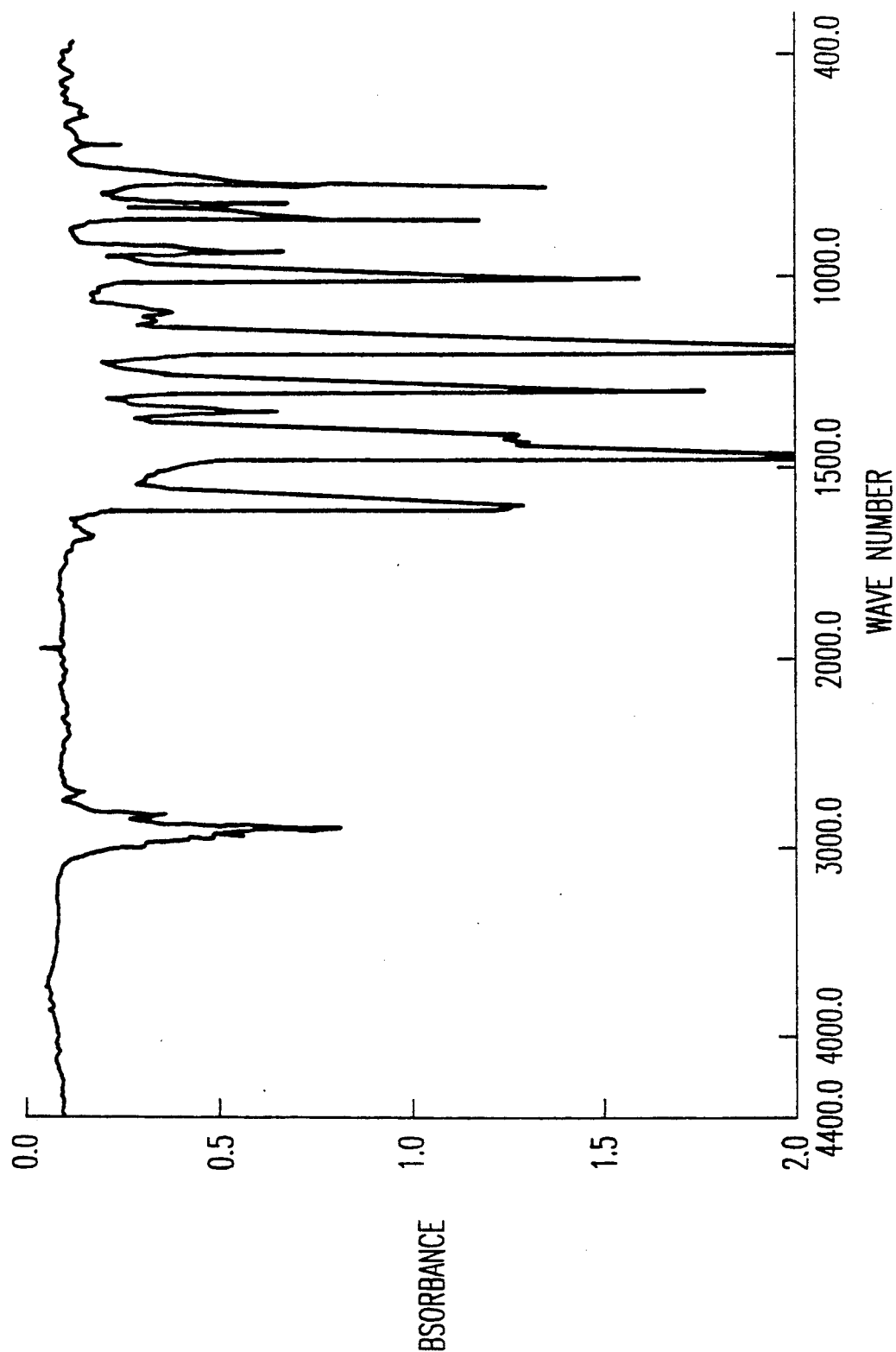
FIG. 3 is an infrared absorption spectrum of hydroxyalkyl-functionalized polyphenylene ether (cast film prepared from a chloroform solution) obtained in Example 6.

These functionalized polyphenylene ethers showed absorptions considered to be derived from a hydroxyl group at a neighbor of 3600 cm$^{-1}$ of an infrared absorption spectrum, respectively. An infrared absorption spectrum of the hydroxyethylated polyphenylene ether (a cast film prepared from a chloroform solution) obtained in Example 6 is shown in FIG. 3.

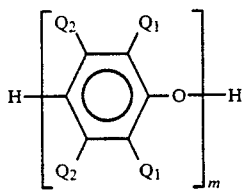

(III)

wherein $Z_1$ each represents a halogen atom, a primary or secondary alkyl group, a phenyl group, an aminoalkyl group, a hydrocarbonoxy group or a halohydrocarbonoxy group; $Q_2$ each represents a hydrogen atom, a halogen atom, a primary or secondary alkyl group, a phenyl group, a haloalkyl

TABLE 1

| Example | Functionalizing agent | Amount used | PPE[1] (g) | EtONa (g) | Solvent (ml) | Reaction temperature (°C.) | Reaction Time (hr) | Yield (g) | Terminal reaction ratio (%) |
|---|---|---|---|---|---|---|---|---|---|
| 6 | 2-chloroethanol | 200 ml | 17.5 | 1.7 | — | 80 | 4 | 16.5 | 42.2 |
| 7 | 3-chloropropanol | 50.0 g | 20.0 | 1.5 | 100[2] | 95 | 7 | 19.4 | 69.3 |
| 8 | 4-chlorobutanol | 200 ml | 20.0 | 2.0 | 50[2] | 93 | 7 | 18.6 | 38.7 |
| 9 | 2-bromoethanol | 20.0 g | 20.0 | 1.5 | — | 105 | 7 | 18.8 | 27.3 |
| 10 | 2-chloroethanol | 50.0 g | 20.0 | 2.0 | 200[3] | 108 | 7 | 19.1 | 45.3 |

[1]PPE: Polyphenylene ether
[2]Toluene
[3]N-methyl-2-pyrrolidone

APPLICATION EXAMPLE 3

100 ml of xylene was added to 5.0 g of the hydroxyethylated polyphenylene ether obtained in Example 6 and 2.0 g of a polypropylene modified with maleic anhydride (maleic anhydride content: 8.1% by weight, number average molecular weight $\overline{Mn}=39,000$, weight average molecular weight $\overline{Mw}=221,000$), and the mixture was reacted under a nitrogen atmosphere at 128° C. for 7 hours. The reaction mixture was poured into one liter of methanol to precipitate a polymer, and the polymer was collected by filtration. Further, the polymer was washed with one liter of methanol and dried at 85° C. under reduced pressure and heating to obtain 6.8 g of a polymer.

Subsequently, 1.29 g of the resulting polymer was extracted by a Soxhlet apparatus using 250 ml of chloroform as a solvent to remove unreacted polyphenylene ether. As the result, an amount of the polyphenylene ether extracted by chloroform was 0.80 g. From this fact, the content of the polyphenylene ether in the resulting polyphenylene etherpolypropylene copolymer was found to be 24.5% by weight.

As shown in the above Examples, the method for preparing the polyphenylene ether in which the terminal group is hydroxyalkyl-functionalized of the present invention is extremely easy, and the resulting product can be easily copolymerized with a treated polypropylene as shown in Application examples 1 to 3.

We claim:

1. A method for preparing a hydroxyalkyl-functionalized polyphenylene ether which comprises reacting a polyphenylene ether represented by the formula:

group, a hydrocarbonoxy group or a halohydrocarbonoxy group; and m is an integer of 10 or more, with a functionalizing agent selected from the group consisting of a glycidol represented by the following formula:

(II$_A$)

and an epihalohydrin represented by the following formula:

(II$_B$)

wherein X represents a halogen atom,
in the presence or absence of an organic solvent capable of dissolving the polyphenylene ether and in the presence of a basic catalyst.

2. The method according to claim 1, wherein said functionalizing agent is a glycidol represented by the following formula:

(II$_A$)

and the hydroxyalkyl-functionalized polyphenylene ether is represented by the following formula:

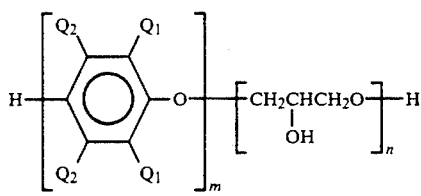

wherein $Q_1$, $Q_2$ and m have the same meanings as defined in claim 1, and n is an integer of 1 to 10.

3. The method according to claim 1, wherein the functionalizing agent is an epihalohydrin represented by the following formula:

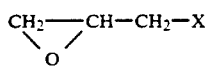

wherein X represents a halogen atom,
and the hydroxyalkyl-functionalized polyphenylene ether obtained by hydrolyzing a terminal glycidylated polyphenylene ether is represented by the following formula:

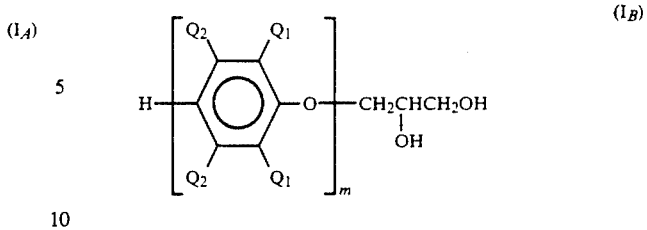

wherein $Q_1$, $Q_2$ and m have the same meanings as defined in claim 1.

4. The method according to claim 1, wherein the polyphenylene ether comprises 2,6-dimethyl-1,4-phenylene ether unit.

5. The method according to claim 3, wherein the epihalohydrin as the functionalizing agent is epichlorohydrin.

6. The method according to claim 1, wherein an amount of the functionalizing agent is 1 to 50 moles per mole of the terminal phenolic hydroxyl group of the polyphenylene ether.

7. The method according to claim 1, wherein an amount of the basic catalyst is 1 to 30 parts by weight based on 100 parts by weight of the polyphenylene ether.

8. The method according to claim 1, wherein a reaction temperature is 50° to 200° C.

* * * * *